(12) United States Patent
Hwang et al.

(10) Patent No.: US 11,635,360 B2
(45) Date of Patent: Apr. 25, 2023

(54) METHOD FOR EVALUATING BINDER

(71) Applicant: Samsung Display Co., Ltd., Yongin-si (KR)

(72) Inventors: Hyeon Deuk Hwang, Cheonan-si (KR); Eun Joong Mun, Seongnam-si (KR); Dong Yeon Lee, Anyang-si (KR); Hyung Don Na, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 349 days.

(21) Appl. No.: 16/685,125

(22) Filed: Nov. 15, 2019

(65) Prior Publication Data

US 2020/0182762 A1 Jun. 11, 2020

(30) Foreign Application Priority Data

Dec. 10, 2018 (KR) .................. 10-2018-0157964

(51) Int. Cl.
  *G01N 3/24* (2006.01)
  *G01N 3/08* (2006.01)
  *C09J 11/00* (2006.01)

(52) U.S. Cl.
  CPC .............. *G01N 3/24* (2013.01); *C09J 11/00* (2013.01); *G01N 3/08* (2013.01)

(58) Field of Classification Search
  CPC ............. G01N 3/24; G01N 3/08; C09J 11/00
  USPC ........................................................ 73/842
  See application file for complete search history.

(56) References Cited

U.S. PATENT DOCUMENTS

| 5,376,589 | A | | 12/1994 | Thienel | |
|---|---|---|---|---|---|
| 5,376,859 | A | * | 12/1994 | Kim | H01L 41/183 310/334 |
| 5,817,945 | A | * | 10/1998 | Morris | G01L 1/24 73/800 |
| 6,023,962 | A | * | 2/2000 | Wang | G01N 11/08 73/54.09 |
| 6,079,277 | A | * | 6/2000 | Chung | G01B 7/18 73/774 |
| 6,955,092 | B2 | * | 10/2005 | Keener | G01N 19/04 73/761 |
| 8,950,267 | B2 | | 2/2015 | Doble et al. | |
| 2002/0187294 | A1 | * | 12/2002 | Zhou | C09J 11/08 428/40.1 |
| 2006/0123890 | A1 | | 6/2006 | Seo et al. | |

(Continued)

FOREIGN PATENT DOCUMENTS

| CN | 103238054 | 8/2013 |
|---|---|---|
| CN | 103383330 | 11/2013 |

(Continued)

OTHER PUBLICATIONS

Chinese Office Action—Chinese Application No. 201911248045 X dated Sep. 29, 2022.

*Primary Examiner* — Octavia Davis Hollington
(74) *Attorney, Agent, or Firm* — Cantor Colburn LLP

(57) ABSTRACT

A method for evaluating a binder includes disposing the binder on a first plate, bringing a second plate, which faces the first plate, into contact with one surface of the binder, applying a stress to the binder through the second plate, measuring a strain of the binder due to the applied stress, and calculating a curing rate of the binder based on the strain of the binder.

20 Claims, 20 Drawing Sheets

(56) References Cited

U.S. PATENT DOCUMENTS

| | | | | |
|---|---|---|---|---|
| 2014/0262002 A1* | 9/2014 | Suwa | ................... | C09J 7/29 |
| | | | | 156/249 |
| 2015/0010766 A1 | 1/2015 | Hwang et al. | | |
| 2016/0355704 A1* | 12/2016 | Takarada | ............. | G02B 5/3033 |
| 2017/0312995 A1 | 11/2017 | Speer | | |

FOREIGN PATENT DOCUMENTS

| CN | 107076653 | | 8/2017 |
|---|---|---|---|
| JP | 0395428 | | 4/1991 |
| KR | 101095383 | | 12/2011 |
| KR | 1020170048440 | | 5/2017 |
| KR | 20170112246 | * | 10/2017 |
| KR | 1020180015718 | | 2/2018 |

* cited by examiner

METHOD FOR EVALUATING BINDER

This application claims priority to Korean Patent Application No. 10-2018-0157964, filed on Dec. 10, 2018, and all the benefits accruing therefrom under 35 U.S.C. 119, the content of which in its entirety is herein incorporated by reference.

BACKGROUND

1. Field

Exemplary embodiments of the invention relate to a method for evaluating a binder.

2. Description of the Related Art

A binder is used in a manufacture of various displays such as computer monitors, large displays such as televisions ("TVs"), and small displays such as mobile phones.

The binder has physical properties such as bonding force, modulus and curing rate ("CR") in a case of a photo-curable binder. The physical properties of the binder may affect whether a display is defective when the binder is applied to the display. If the binder does not have a sufficient bonding force, for example, separation between stacked structures of the display may cause a bonding defect between the display structures, or weaken a moisture penetration resistance and an impact resistance of the display.

Further, the display includes a stepped portion between the stacked structures. Particularly, a stepped portion may be formed in a lower part of a window due to a black matrix disposed on the edge of the window of the display. The binder combines adhesion members such as a window and a panel (a display panel or a touch panel) disposed under the window. When the binder does not evenly fill the stepped portion formed at the edge of the window, undesirable bending may occur in the panel disposed under the window. Such bending may cause a display failure of the display.

SUMMARY

A photo-curable binder is partially uncured to compensate for a step difference before a full curing process. When a curing rate is higher than a reference value, a compensation function of the step difference formed on an edge of a window cannot be performed smoothly.

Exemplary embodiments of the invention provide a method for evaluating a curing rate of a binder.

Exemplary embodiments of the invention also provide a method for evaluating whether the binder is defective by measuring the physical properties of the binder.

However, exemplary embodiments of the invention are not restricted to those set forth herein. The above and other exemplary embodiments of the invention will become more apparent to one of ordinary skill in the art to which the invention pertains by referencing the detailed description of the invention given below.

An exemplary embodiment of a method for evaluating a binder includes disposing the binder on a first plate, bringing a second plate, which faces the first plate, into contact with one surface of the binder, applying a stress to the binder through the second plate, measuring a strain of the binder due to the applied stress, and calculating a curing rate of the binder based on the strain of the binder.

An exemplary embodiment of a method for evaluating a binder includes disposing the binder on a first plate, bringing a second plate, which faces the first plate, into contact with one surface of the binder, applying a stress to the binder through the second plate, measuring a strain of the binder due to the applied stress, and determining whether the binder is defective by comparing the measured strain of the binder with a previously stored strain of a non-defective binder.

According to embodiments of the invention, it is possible to provide a method for evaluating a binder by calculating a curing rate of the binder by measuring a shear stress F1 of the binder.

According to other exemplary embodiments of the invention, it is possible to provide a method for evaluating a binder, including determining whether the binder is defective by measuring a shear stress or compressive stress of the binder.

The effects of the invention are not limited to the above-described effects and other effects which are not described herein will become apparent to those skilled in the art from the following description.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
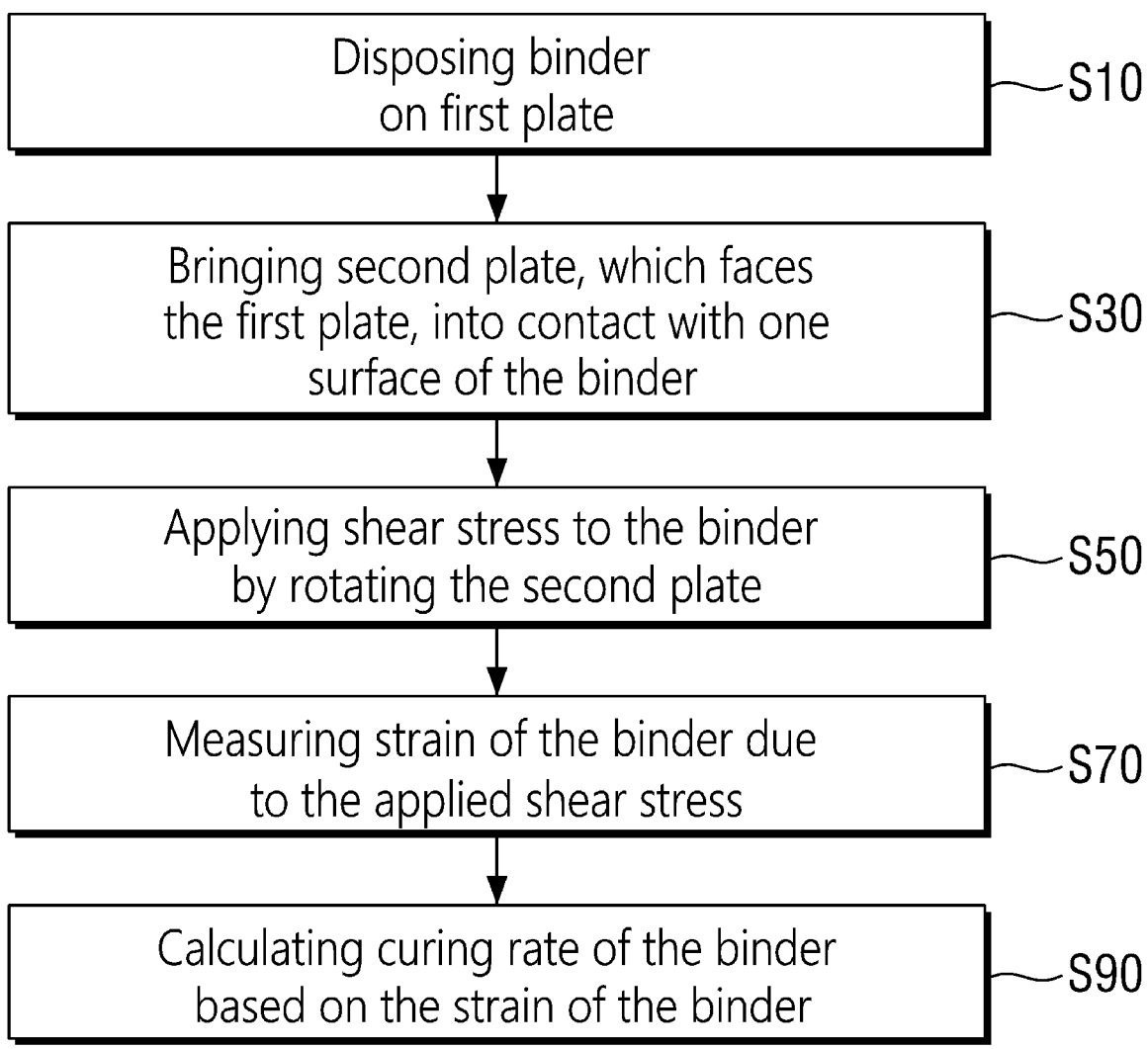
FIG. 1 is a flowchart of an exemplary embodiment of a method for evaluating a binder.

The invention will now be described more fully hereinafter with reference to the accompanying drawings, in which preferred embodiments of the invention are shown. This invention may, however, be embodied in different forms and should not be construed as limited to the exemplary embodiments set forth herein. Rather, these embodiments are provided so that this invention will be thorough and complete, and will fully convey the scope of the invention to those skilled in the art.

It will also be understood that when a layer is referred to as being "on" another layer or substrate, it may be directly on the other layer or substrate, or intervening layers may also be present. The same reference numbers indicate the same components.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

An adhesive may typically include an adhesive material used to bond adhesion members. Examples of the adhesive material may include a polymer material such as a silicone polymer, a urethane polymer, a silicone-urethane ("SU") hybrid polymer, an acrylic polymer, an isocyanate polymer, a polyvinyl alcohol polymer, a gelatin polymer, a vinyl polymer, a latex polymer, a polyester polymer, or a water-based polyester polymer.

The adhesive may be a photo-curable adhesive. The photo-curable adhesive may include a material that may be cured in response to light. The material may include a photo-initiator or the like. The photo-curable adhesive may be applied to the adhesion members in a liquid phase and then cured into a solid phase through photo-curing, e.g., ultraviolet ("UV") curing. In an exemplary embodiment, the adhesive may be optically clear resin ("OCR") or liquid optically clear adhesive ("LOCA"). In an exemplary embodiment, the OCR may be in a liquid phase having a storage elastic modulus of about 103 pascals (Pa) or less before photo-curing, but may be changed into a solid phase having a storage elastic modulus of about 106 Pa or more after photo-curing, for example.

A tackifier may include a pressure sensitive adhesive ("PSA"). The PSA may include an acrylic or rubber-based polymer cured product. The PSA may be of the film type.

The PSA may include an OCA. The OCA may be a photo-curable OCA. The photo-curable optically clear adhesive includes a material that may be cured in response to light, such as a photo-initiator, in the same manner as the photo-curable adhesive. The photo-curable optically clear adhesive may be, for example, a UV-curable optically clear adhesive ("UV-OCA") which undergoes a curing reaction by UV light. The photo-curable optically clear adhesive may be applied to the adhesion members in a liquid phase and then cured into a solid phase through photo-curing, e.g., UV curing.

The OCA may be in a semi-solid phase having a storage elastic modulus of about $10^3$ Pa to about $10^5$ Pa before photo-curing, but may be changed and cured into a solid phase having a storage elastic modulus of about $10^6$ Pa to about $10^7$ Pa after photo-curing.

A photo-curable binder is disposed between adhesion members (e.g., between a window and a lower panel) and serves to bond them. The binder is partially photo-cured in a semi-solid state before being applied to the adhesion members. When a curing rate ("CR") is not sufficient at this time, even when a photo-curing process is subsequently performed on the adhesion members, a sufficient curing rate cannot be secured and a sufficient bonding force cannot be obtained, which may cause poor bonding of a display device to which the binder is applied. When the curing rate CR of the binder is excessively high, a stepped portion of the display device cannot be evenly filled, which may cause a display failure. Hereinafter, a method for evaluating a binder, particularly a method for evaluating whether a binder is defective by measuring the curing rate CR of the binder will be described with reference to FIGS. 1 to 4.

Figure 2:
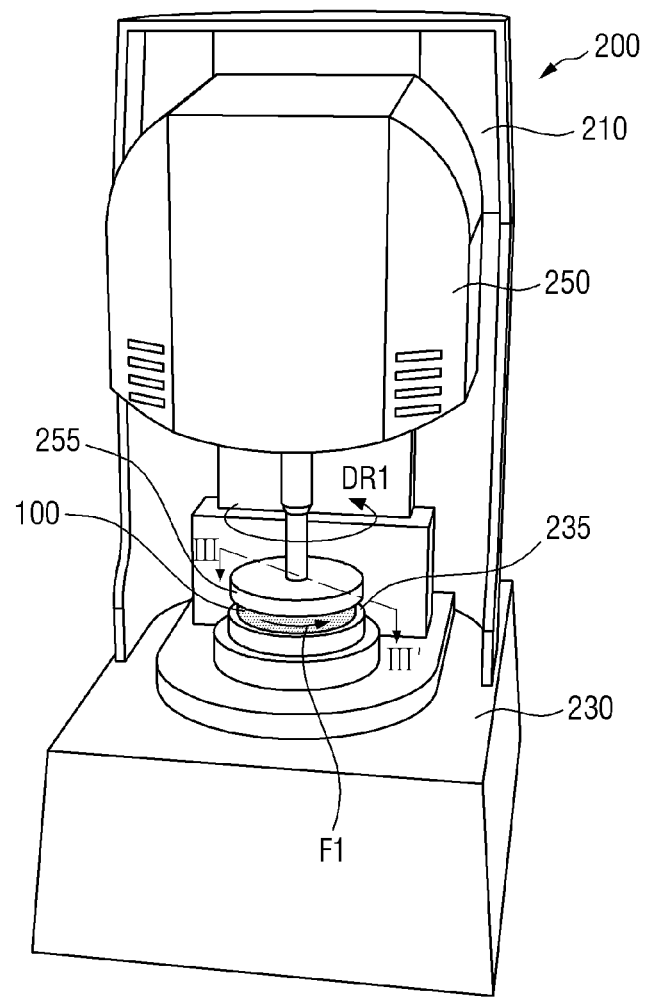
FIG. 2 is a perspective view showing an exemplary embodiment of a measurement apparatus which measures a binder.
Figure 3:
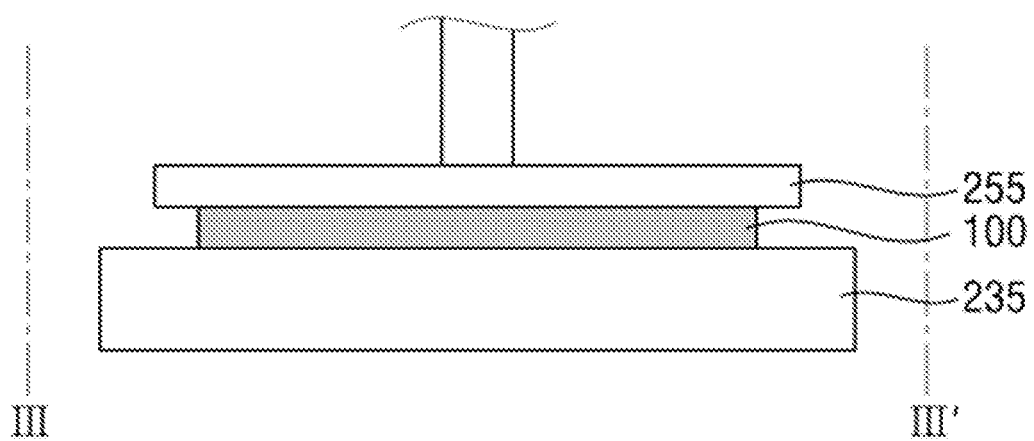
FIG. 3 is a cross-sectional view taken along line of FIG. 2.
Figure 4:
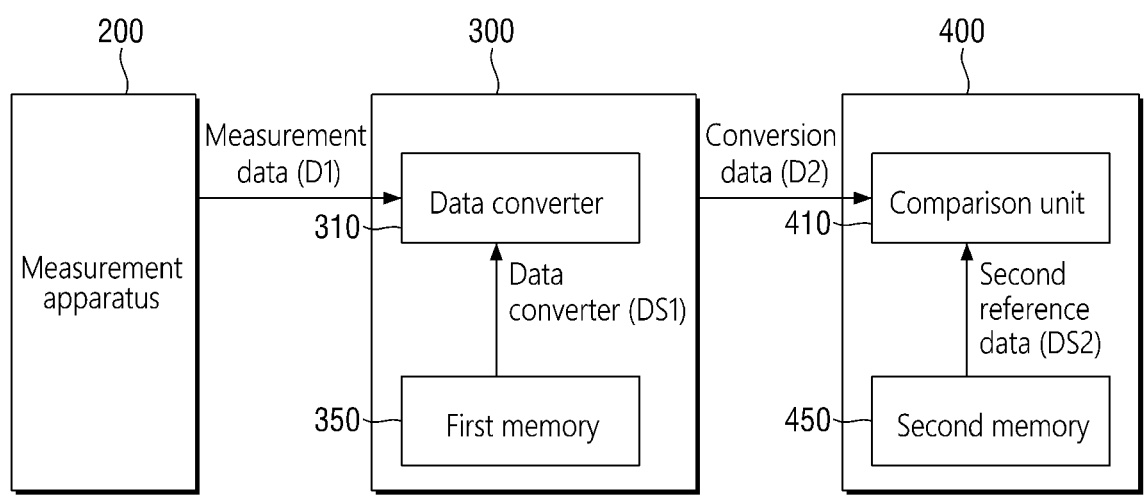
FIG. 4 is a block diagram illustrating an exemplary embodiment of a method for evaluating a binder.
Figure 5:
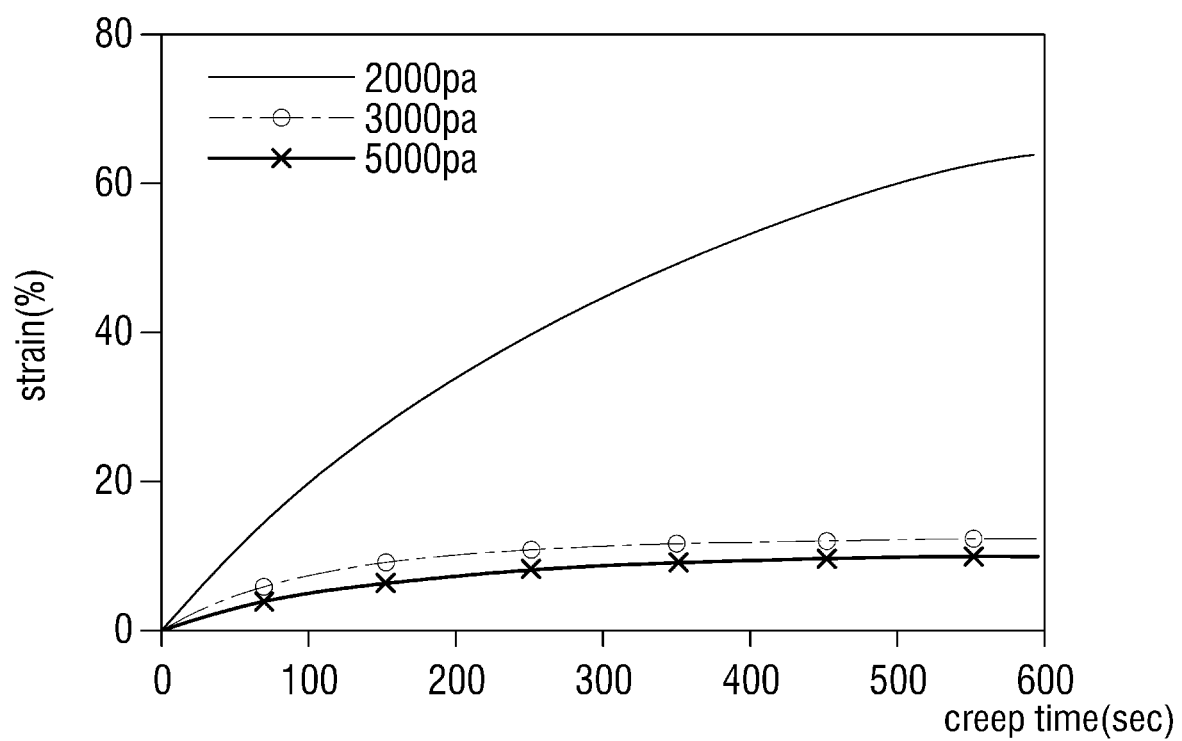
FIG. 5 is a graph showing time-dependent strain according to light intensity.
Figure 6:
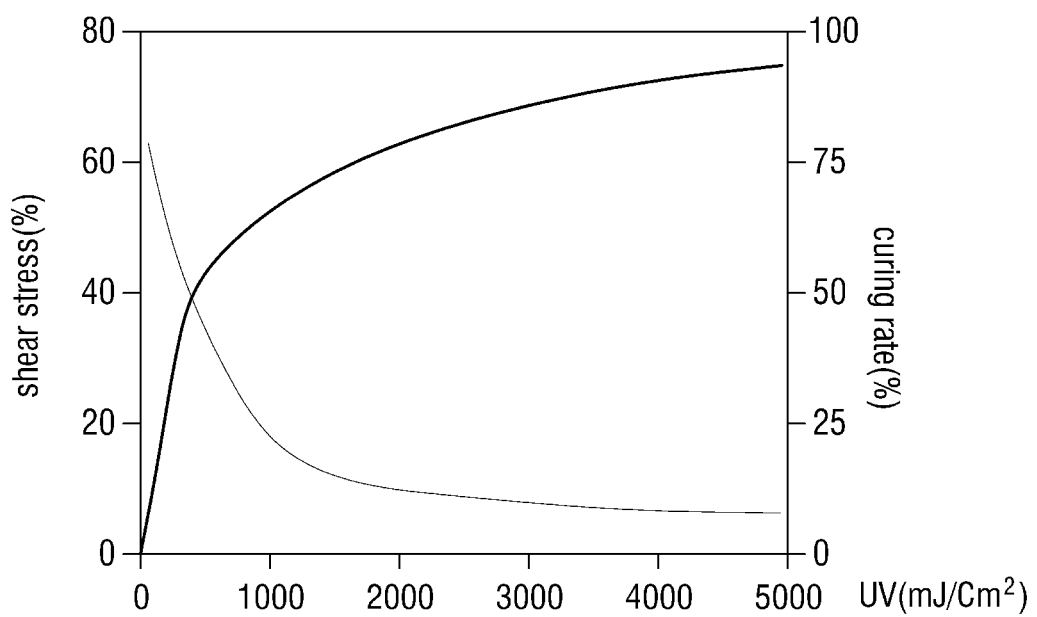
FIG. 6 is a graph showing correlation between shear stress and curing rate according to light intensity.

FIG. 1 is a flowchart of an exemplary embodiment of a method for evaluating a binder. FIG. 2 is a perspective view showing an exemplary embodiment of a measurement apparatus which measures a binder. FIG. 3 is a cross-sectional view taken along line III-III' of FIG. 2. FIG. 4 is a block diagram illustrating an exemplary embodiment of a method for evaluating a binder. FIG. 5 is a graph showing time-dependent strain according to light intensity. FIG. 6 is a graph showing correlation between shear stress and curing rate according to light intensity.

Referring to FIGS. 1 and 6, the physical properties of a binder 100 are measured by a measurement apparatus 200. The binder 100 may be the above-described adhesive or tackifier, and may be a photo-curable binder 100. The physical properties of the binder 100 may be a strain of the binder 100 by the applied stress.

The measurement apparatus 200 includes a body 210, a support 230, a power unit 250, a first plate 235 and a second plate 255.

As shown in FIG. 2, the body 210 of the measurement apparatus 200 may be provided to extend in a vertical direction of the measurement apparatus 200.

The support 230 of the measurement apparatus 200 is connected to the body 210 and is located below the measurement apparatus 200 to support other components of the measurement apparatus 200.

The power unit 250 of the measurement apparatus 200 is physically connected to the body 210 to be movable in the vertical direction.

The first plate 235 and the second plate 255 of the measurement apparatus 200 may be physically connected to the support 230 and the power unit 250 of the measurement apparatus 200, respectively. Specifically, the first plate 235 may be disposed on the support 230 and physically fixed to the support 230.

The second plate 255 is disposed below the power unit 250 and may be rotated in one direction by the power unit 250. As shown in FIG. 2, the second plate 255 may be rotated in a first direction DR1 by the power unit 250.

An exemplary embodiment of the measurement apparatus 200 includes an apparatus for measuring a strain Cms of the binder 100 to which a shear stress F1 is applied. In an exemplary embodiment, the measurement apparatus 200 may be a rheometer, for example.

Referring to FIG. 1, the binder 100 is disposed on the first plate 235 (S10). The first plate 235 may include a stainless steel material. In an exemplary embodiment, the first plate 235 may have a planar jig of about 6 millimeters (mm) to about 8 mm, for example. When the planar jig of the first plate 235 is larger than 8 mm, a bonding force between the binder 100 and the first plate 235 increases in proportion to the increased planar jig. Accordingly, an external force applied to the binder 100 may be unnecessarily increased.

If the planar jig of the first plate 235 is smaller than 6 mm, the binder 100 disposed thereon may flow outward due to an external force during measurement, which may make accurate measurement difficult.

In an exemplary embodiment, the binder 100 may have a thickness of about 800 micrometers (μm) to about 1000 μm, for example.

Then, the second plate 255 facing the first plate 235 is brought into contact with one surface of the binder 100 (S30).

The power unit 250 may move in an extending direction (vertical direction) of the body 210 while being coupled to the body 210. The second plate 255 connected to the power unit 250 may be in contact with one surface of the binder 100 while the power unit 250 moves downward.

The planar jig of the second plate 255 may be smaller than the planar jig of the first plate 235, but the invention is not limited thereto. In another exemplary embodiment, the planar jig of the second plate 255 may be substantially equal to or larger than the planar jig of the first plate 235. The planar jig of the second plate 255 may be larger than the planar size of the binder 100 interposed between the first plate 235 and the second plate 255.

Then, the measurement apparatus 200 rotates the second plate 255 to apply the shear stress F1 to the binder 100 (S50). The operation S50 of applying the shear stress F1 to the binder 100 by rotating the second plate 255 may include rotating the second plate 255 in a first direction DR1 while the first plate 235 is fixed to the upper surface of the support 230. Accordingly, a lower portion of the binder 100 adjacent to the first plate 235 may be substantially fixed while an upper portion of the binder 100 adjacent to the second plate 255 may be rotated along a rotation direction (first direction DR1) of the second plate 255. As forces in relatively different directions are applied to the upper and lower portions of the binder 100, the binder 100 is deformed in the first direction DR1 due to the applied shear stress F, and the strain Cms of the binder 100 at this time may be measured.

The operation S50 of applying the shear stress F1 to the binder 100 by rotating the second plate 255 may be performed at a measurement temperature of about −10 degrees Celsius (° C.) to about 90° C., for example. In an exemplary embodiment, the operation of applying the shear stress F1 to the binder 100 by rotating the second plate 255 may be performed at about 70'C to about 90° C., which corresponds to an autoclave temperature to remove the bubbles of the binder 100, for example. Consequently, the strain Cms of the binder 100 may be measured while an autoclave process of the binder 100 is performed.

When the strain Cms of the binder 100 is measured, the strain Cms of the binder 100 differs depending on the measurement temperature. Thus, when the shear stress F1 is applied to a plurality of binders 100 to measure the strain Cms, the operation of applying the shear stress F1 to each binder 100 are performed at the same measurement temperature.

Further, in an exemplary embodiment, the operation S50 of applying the shear stress F1 to the binder 100 by rotating the second plate 255 may include applying the shear stress F1 of about $10^3$ Pa to about $50^3$ Pa. The operation S50 of applying the shear stress F1 to the binder 100 may include continuously applying the shear stress F1 having a constant value within the above-mentioned range of the shear stress F1. In the illustrated exemplary embodiment, the shear stress F1 may range from about 1500 Pa to about 2500 Pa, but the invention is not limited thereto.

Then, the measurement apparatus 200 generates measurement data D1 including the strain Cms of the binder 100 due to the applied shear stress F1 (S70). The measurement data D1 may be a shear strain Cms of the binder 100 to which the shear stress F1 is applied. As shown in FIG. 4, the measurement apparatus 200 may provide the generated measurement data D1 to a conversion unit 300.

Thereafter, the conversion unit 300 calculates the curing rate CR of the binder 100 based on the measurement data D1 (S90). The operation S90 of causing the conversion unit 300 to calculate the curing rate CR of the binder 100 based on the measurement data D1 may include calculating conversion data D2 (curing rate CR) through the measurement data D1 and first reference data DS1 which has been previously stored.

The conversion unit 300 serves to generate conversion data D2 through the measurement data D1 provided by the measurement apparatus 200 and the previously stored first reference data DS1. As described above, the measurement data D1 is the strain Cms due to the shear stress F1 of the binder 100, and the conversion data D2 is the curing rate CR of the binder 100.

The operation S90 of calculating the curing rate CR of the binder 100 based on the measurement data D1 may include calculating the curing rate CR of the binder 100 further based on a strain Cuc of the uncured binder and a strain Cfc of the fully cured binder which have been previously stored. The uncured binder and the fully cured binder may be different from the binder 100 of the illustrated exemplary embodiment.

The operation of calculating the curing rate CR of the binder 100 based on the measurement data D1 may include measuring all of the previously stored strain Cuc of the uncured binder, the previously stored strain Cfc of the fully cured binder and a strain Cmc of the binder 100 included in the measurement data D1 in the same environment.

In an exemplary embodiment, the previously stored strain Cuc of the uncured binder, the previously stored strain Cfc of the fully cured binder and the strain Cmc of the binder 100 included in the measurement data D1 may be measured at the same temperature, for example.

As will be described later, the strain Cms of the binder 100 may be different depending on the intensity of the applied shear stress F1. Accordingly, the previously stored strain Cuc of the uncured binder, the previously stored strain Cfc of the fully cured binder and the strain Cmc of the binder 100 included in the measurement data D1 may be measured at the same shear stress F1.

The conversion unit 300 may include a data converter 310 and a first memory 350. The data converter 310 converts the measurement data D1 and the previously stored first reference data DS1 to generate converted data D2. The first memory 350 stores the first reference data DS1, and transmits the previously stored first reference data DS1 when the data converter 310 generates the converted data D2.

The first reference data DS1 may be the previously stored strain Cuc of the uncured binder and the previously stored strain Cfc of the fully cured binder. That is, the first memory 350 may provide the data converter 310 with the previously stored strain Cuc of the uncured binder and the previously stored strain Cfc of the fully cured binder.

The data converter 310 calculates the curing rate CR of the binder 100 through the measurement data D1, i.e., the strain Cms of the binder 100, the previously stored strain Cuc of the uncured binder and the previously stored strain Cfc of the fully cured binder.

The operation S90 of calculating the curing rate CR of the binder 100 based on the measurement data D1 may further include calculating the curing rate CR of the binder 100 by a conversion equation.

The conversion equation is as follows:

$$CR(\text{Curing Rate}(\%)) = \frac{\{(Cuc - Cfc) - (Cms - Cfc)\} \times 100}{(Cuc - Cfc)},$$

where Cuc is the strain of the uncured binder, Cfc is the strain of the fully cured binder, and Cms is the strain of the binder 100.

Here, each strain may be a shear strain.

The curing rate CR may be determined according to the intensity of irradiation light. Without being limited thereto, the curing rate CR may be controlled through the above-described photo-initiator, material combination, or the like.

With reference to the conversion equation, the curing rate CR and the strain Cms of the binder 100 have correlation with each other. The correlation will be described in more detail with reference to FIGS. 5 and 6. In FIG. 5, a horizontal axis represents the measurement time and a vertical axis represents the strain. In FIG. 6, a horizontal axis represents the intensity of the irradiation light and a vertical axis represents the strain.

FIG. 5 shows the strain Cms of the binder 100 according to the measurement time while changing the intensity of the curing irradiation light. FIG. 6 shows correlation between the strain Cms of the binder 100 and the curing rate CR of the binder 100.

Since FIGS. 5 and 6 show an example illustrating the correlation between the above-described variables, the invention is not limited to the specific numerical values set forth above.

Referring to FIGS. 5 and 6, the strain Cms of the binder 100 may be substantially proportional to the curing rate CR. That is, the strain Cms of the binder 100 may increase as the curing rate CR increases, and the strain Cms of the binder 100 may decrease as the curing rate CR decreases.

An evaluation method 1 of the binder 100 according to the illustrated exemplary embodiment may include converting the strain Cms of the binder 100 into the curing rate CR of the binder 100 by the conversion equation described above, so that the curing rate CR of the binder 100 may be accurately measured before being applied to the display device.

The evaluation method 1 of the binder 100 according to the illustrated exemplary embodiment may further include, after performing the operation S90 of calculating the curing rate CR of the binder 100, determining whether the binder 100 is defective by comparing the curing rate CR of the binder 100 with second reference data DS2 (standard curing rate) which has been previously stored.

Referring to FIG. 4, the conversion unit 300 provides the conversion data D2 to a controller 400. The controller 400 may include a comparison unit 410 and a second memory 450. The comparison unit 410 may compare the conversion data D2 provided by the conversion unit 300 with the second reference data DS2 stored in the second memory 450 to determine whether the binder 100 is defective.

The conversion data D2 may be the curing rate CR of the binder 100, and the previously stored second reference data DS2 may be the previously stored standard curing rate of the binder which is non-defective.

Further, the operation of determining whether the binder 100 is defective may include determining that the binder 100 is non-defective when the curing rate CR of the binder 100 is within a reference range of the second reference data DS2 (standard curing rate).

In the illustrated exemplary embodiment of the evaluation method 1 of the binder 100, while the curing rate CR of each binder is accurately calculated, whether the binder is defective is determined. Thus, it is possible to prevent a bonding defect and/or a display failure which may occur when a defective binder is applied to a display device.

Hereinafter, other exemplary embodiments will be described. In the following embodiments, the same components as those in the exemplary embodiments described FIG. 7 is a flowchart of another exemplary embodiment of a method for evaluating a binder, and FIG. 8 is a graph showing a strain over measurement time.

Figure 7:
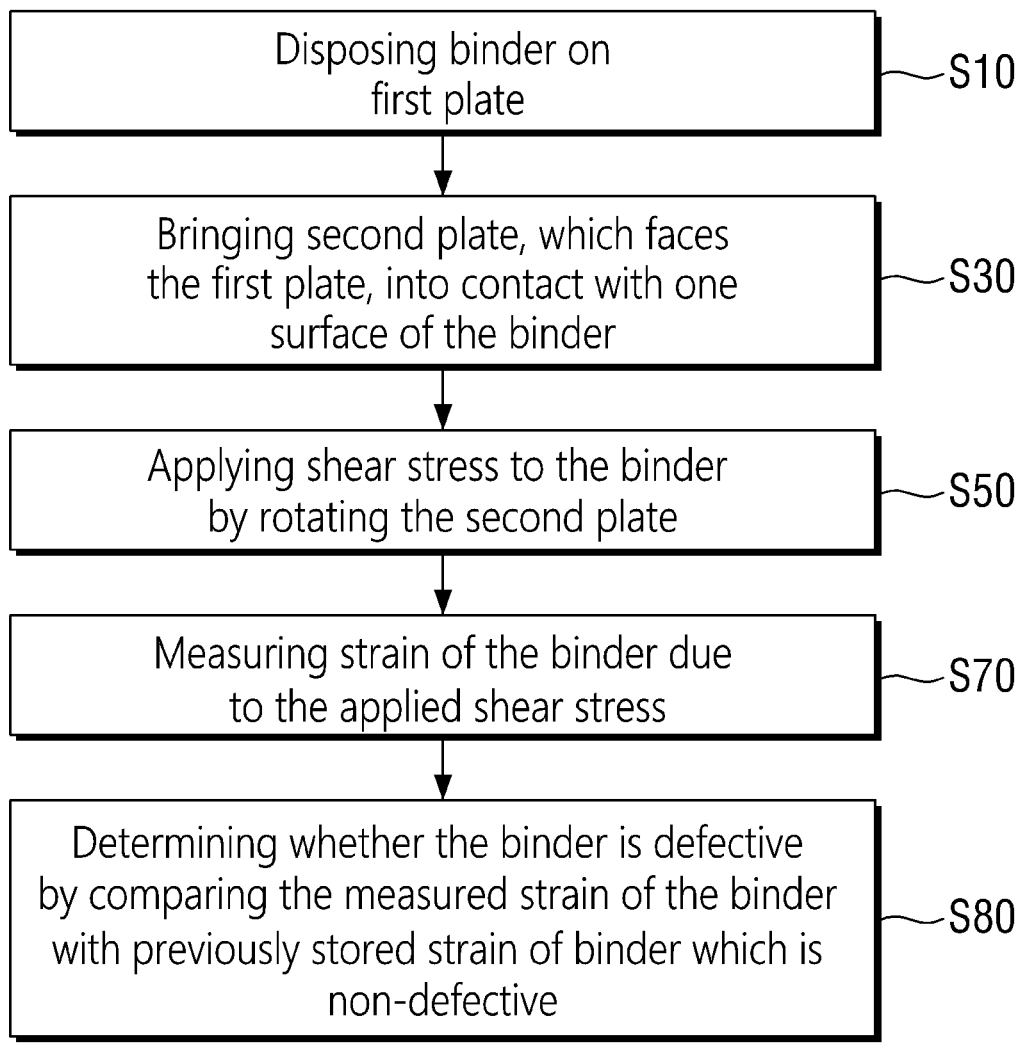
FIG. 7 is a flowchart of another exemplary embodiment of a method for evaluating a binder.
Figure 8:
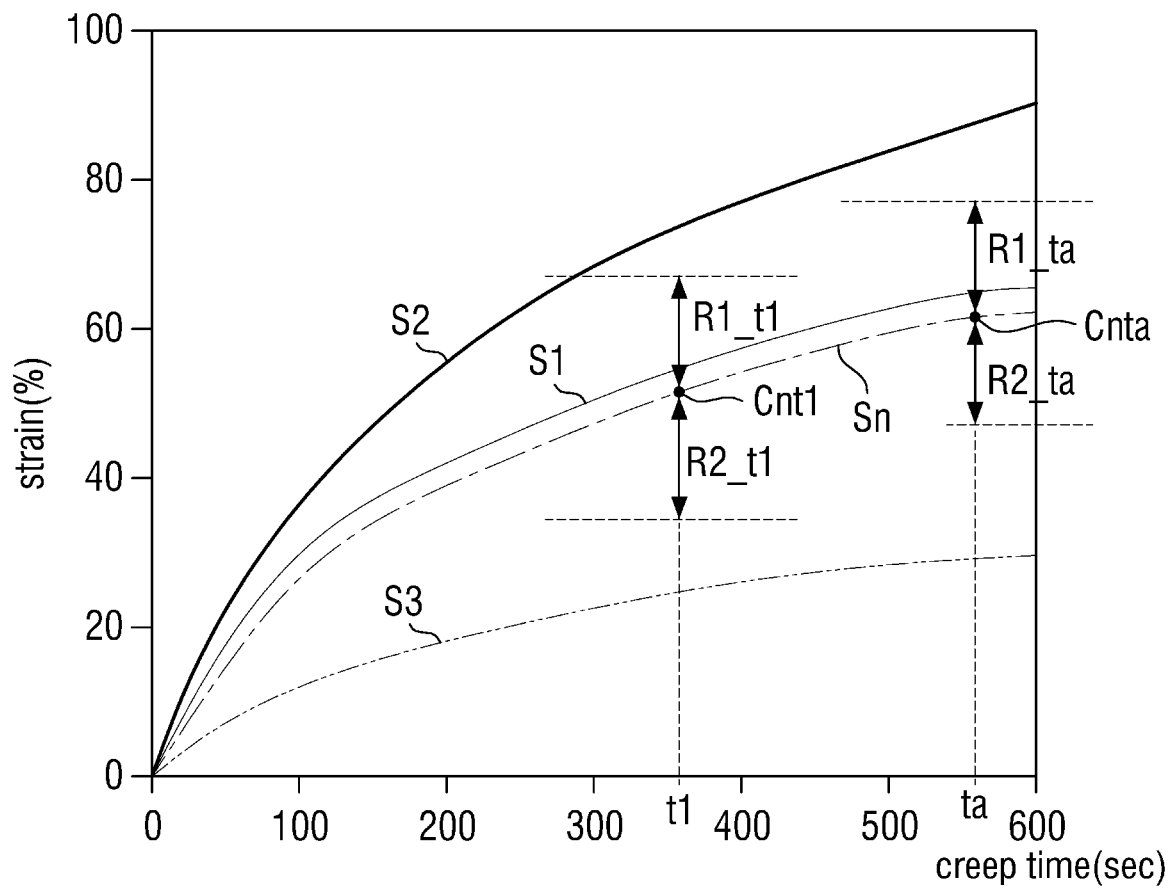
FIG. 8 is a graph showing a strain over measurement time.

Referring to FIGS. 2, 7 and 8, the illustrated exemplary embodiment of an evaluation method 2 of the binder 100 is different from the exemplary embodiment of the evaluation method 1 of the binder 100 in that the evaluation method 2 includes, after the operation S70 of generating the measurement data D1, evaluating whether the binder 100 is defective by comparing the measurement data D1 of the binder 100 (strain Cms of the binder 100) with the previously stored reference data (strain Cn of a binder Sn which is non-defective).

More specifically, in the illustrated exemplary embodiment of the evaluation method 2 of the binder 100, it is possible to evaluate whether the binder 100 is defective by transmitting the measurement data D1 generated by the measurement apparatus 200 to the controller 400 without passing through the conversion unit 300 to compare the measurement data D1 with the previously stored second reference data. The second reference data may be the strain Cn of the non-defective binder Sn.

The previously stored strain Cn of the non-defective binder Sn may have a different value depending on the measurement time. As described above, since the strain of the binder may vary in proportion to the measurement time, when the strain Cms of the binder 100 is compared with the previously stored strain Cn of the non-defective binder Sn, strains may be compared at the same measurement time.

The illustrated exemplary embodiment of the evaluation method 2 of the binder 100 may evaluate a plurality of binders 100. In an exemplary embodiment, the plurality of binders 100 may include a first sample S1, a second sample S2 and a third sample S3, for example. The samples S1, S2 and S3 may have different strains at the same measurement time under the same shear stress F1. This will be described in more detail with reference to FIG. 8.

FIG. 8 is a graph comparing strains of different binder samples S1, S2 and S3 measured at a first time t1 with the strain Cn of the non-defective binder Sn. A horizontal axis represents the measurement time and a vertical axis represents the strain of each binder. Since FIG. 8 shows the strain of each of the samples S1, S2 and S3 and the strain Cn of the non-defective binder Sn, but shows an example illustrating the correlation therebetween, the invention is not limited to the specific numerical values set forth above.

Referring to FIG. 8, the strain of each of the samples S1, S2 and S3 may increase as the measurement time increases. That is, when a certain shear stress is applied to the binder samples S1, S2 and S3 in the same direction, the strain of each of the binder samples S1, S2 and S3 tends to diverge in a positive direction.

Further, as the measurement time increases, a difference between the strain Cn of the non-defective binder Sn and the strain of each of the binder samples S1, S2 and S3 tends to be larger. Thus, it is possible to easily sort non-defective and defective samples.

The operation S80 of evaluating whether the binder 100 is defective by comparing the strain Cms of the binder 100 with the previously stored strain Cn of the non-defective binder Sn may include determining that it is non-defective when the strain of each of the samples S1, S2 and S3 is within a predetermined reference range of the strain Cn of the non-defective binder Sn, and determining that it is defective when the strain is outside the reference range. The strain Cn of the non-defective binder Sn may vary with time. That is, the strain of the non-defective binder Sn is a strain Cnt1 at an arbitrary measurement time t1, and the strain Cn may vary depending on the measurement time.

The operation S80 of evaluating whether the binder 100 is defective by comparing the strain Cms of the binder 100 with the previously stored strain Cn of the non-defective binder Sn may include determining that the measured sample is non-defective when a strain Cnt1 of the non-defective binder Sn at a first measurement time t1 is within a range between a value increased by a first reference range R1_t1 and a value decreased by a second reference range R2_t1, and determining that the measured sample is defective when the strain Cnt1 of the non-defective binder Sn at the first measurement time t1 is outside the range between the value increased by the first reference range R1_t1 and the value decreased by the second reference range R2_t1. The first reference range R1_t1 and the second reference range R2_t1 may have the same value.

In some exemplary embodiments, the operation S80 of evaluating whether the binder 100 is defective by comparing the strain Cms of the binder 100 with the previously stored strain Cn of the non-defective binder Sn may be performed at a standard measurement time ta. In an exemplary embodiment, the standard measurement time ta may be about 500 seconds (s) to about 700 s, for example.

That is, when a strain Cnta of the non-defective binder Sn in a range of the standard measurement time ta is within a range between a value increased by a first reference range R1_ta and a value decreased by a second reference range R2_ta, it may be determined that the measured sample is non-defective. However, when the strain Cnta of the non-defective binder Sn in the range of the standard measurement time ta is outside the range between the value increased by the first reference range R1_ta and the value decreased by the second reference range R2_ta, it may be determined that the measured sample is defective. Specifically, in an exemplary embodiment, each of the first reference range R1_ta and the second reference range R2_ta may have a value of about 15 percent (%), for example. All the samples having a strain in the range of +15% to −15% of the strain Cnta of the non-defective binder Sn at the standard measurement time ta may be determined to be non-defective, and all the samples having a strain in the other range (greater than +15%, less than −15%) may be determined to be defective.

The strain Cms of the binder 100 may vary depending on the intensity of the shear stress F1. In some exemplary embodiments, since the strain of the binder 100 varies depending on the intensity of the shear stress F1, the strain of each of the samples S1, S2 and S3 may be measured while amplifying the intensity of the shear stress F1. This will be described with reference to FIGS. 9 to 11.

Figure 9:
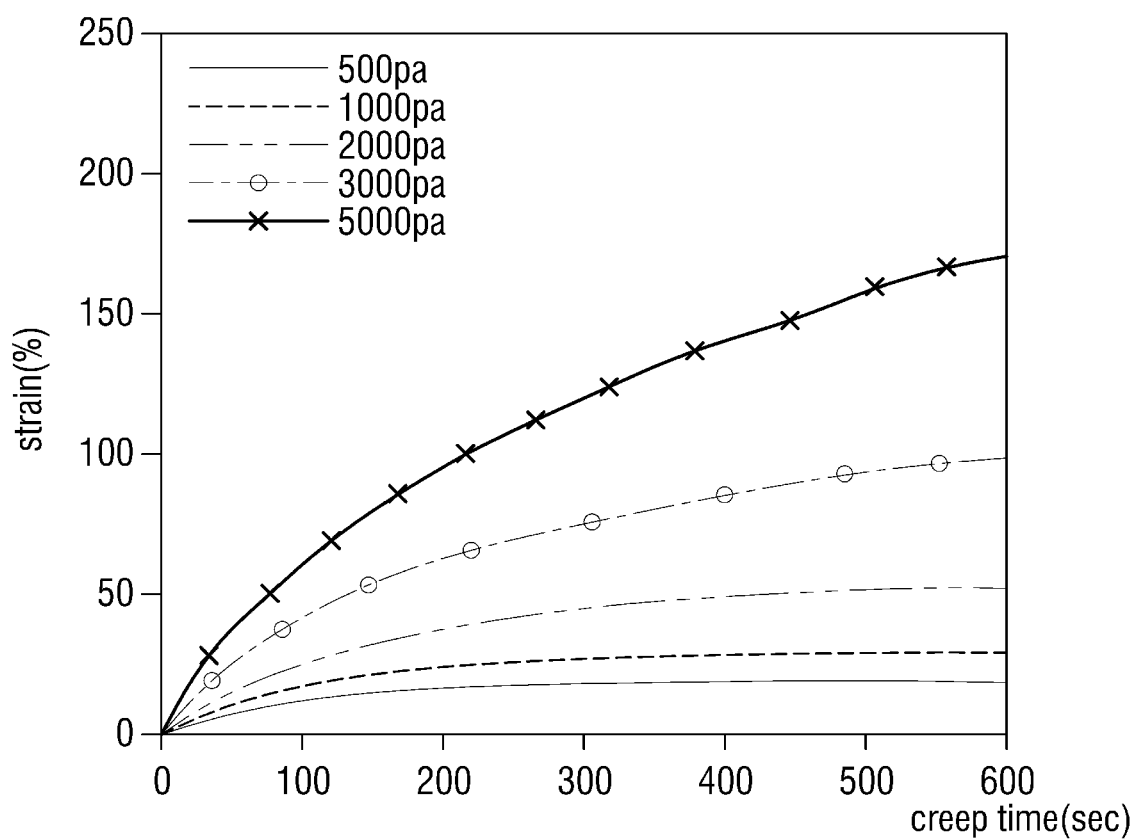
FIGS. 9 to 11 are graphs showing the strains according to the shear stress intensity of each sample.
Figure 10:
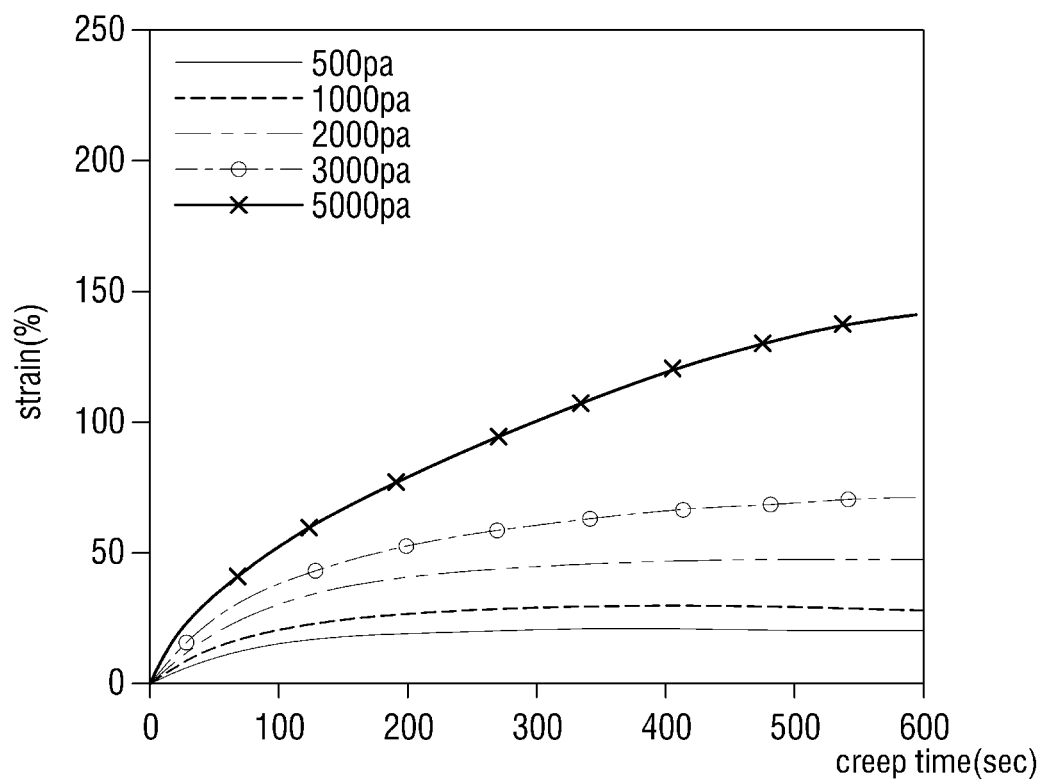
Figure 11:
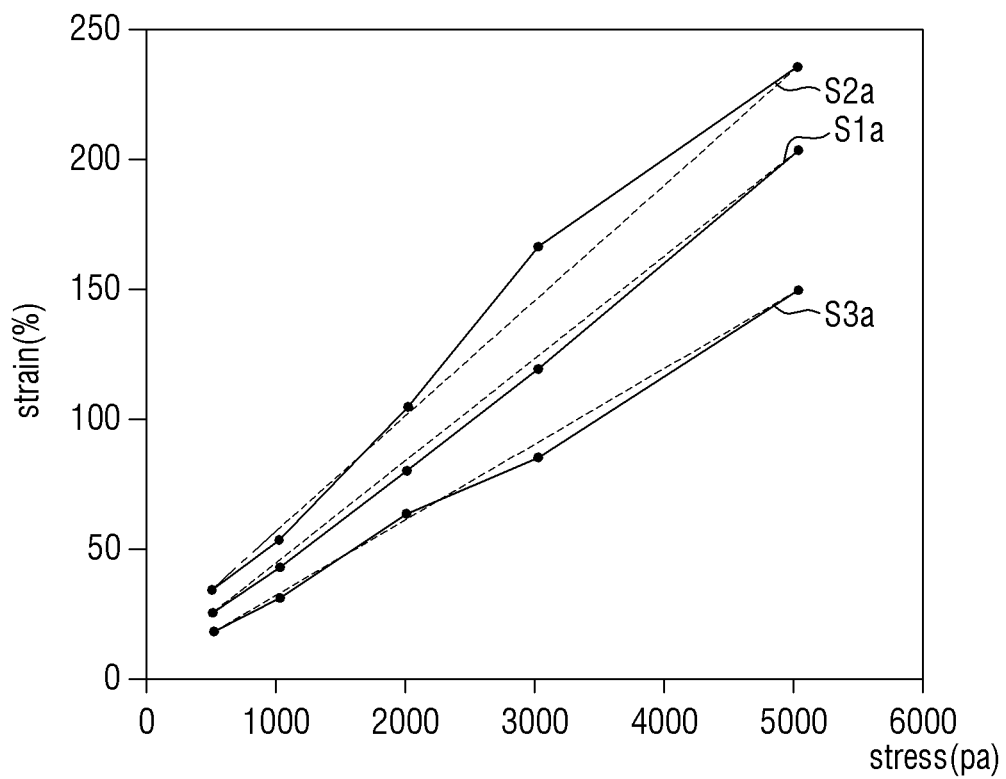

FIGS. 9 to 11 are graphs showing the strains according to the shear stress intensity of the binder. FIG. 9 shows the strain according to an increase in the shear stress intensity of the non-defective product among the binder samples, and FIG. 10 shows the strain according to an increase in the shear stress intensity of the defective product among the binder samples. In FIGS. 9 and 10, a horizontal axis represents the measurement time and a vertical axis represents the strain of the binder. In FIG. 11, a horizontal axis represents the shear stress intensity, and a vertical axis represents the strain of the binder. FIGS. 9 and 10 are exemplary diagrams illustrating the correlation between the shear stress intensity and the strain of the binder samples, and FIG. 11 is a more specific diagram showing the correlation between the intensity of the shear stress F1 and the strain of each of the samples S1, S2 and S3 described in FIG. 8. However, the invention is not limited to the specific numerical values shown in FIG. 11.

Referring to FIGS. 9 to 11, the illustrated exemplary embodiment of the method for evaluating the binder may include measuring the strain of the binder while increasing the shear stress according to the measurement time. That is, the operation S70 of generating the measurement data D1 may include measuring the strain of the binder while increasing the shear stress according to the measurement time. In the operation S70 of generating the measurement data D1, measuring the strain of the binder while increasing the shear stress according to the measurement time may include increasing the shear stress from about 1000 Pa to about 5000 Pa, for example.

An increase in strain according to an increase in shear stress in non-defective samples may be larger than an increase in strain according to an increase in shear stress in defective samples. That is, as the shear stress intensity increases, a difference in strain between the non-defective product and the defective product may increase. Further, a difference between the strain of the non-defective binder and the strain of the defective sample may increase. Thus, it is possible to easily sort non-defective and defective samples.

As shown in FIG. 11, the strain of each of binder samples S1a, S2a and S3a may increase with an increase in shear stress intensity. The correlation between their strains according to the shear stress intensity may be plotted in a substantially linear shape.

However, depending on the curing rate of each of the binder samples S1a, S2a and S3a, an increase in strain due to an increase in shear stress intensity may be different. That is, the slopes of the respective straight lines which have been plotted may be different. That is, the slope of the plotted straight line of the second sample S2a may be larger than the slope of the plotted straight lines of the first sample S1a and the third sample S3a. The slope of the plotted straight line of the first sample S1a may be larger than the slope of the plotted straight line of the third sample S3a.

The strain according to the different shear stress intensity of each of the binder samples S1a, S2a and S3a may be plotted in a substantially linear shape, and a unique relation may be derived for each of the binder samples S1a, S2a and S3a. By the unique relation as a unique factor of each of the binder samples S1a, S2a and S3a, it is possible to further facilitate the management of each of the binder samples S1a, S2a and S3a.

Figure 12:
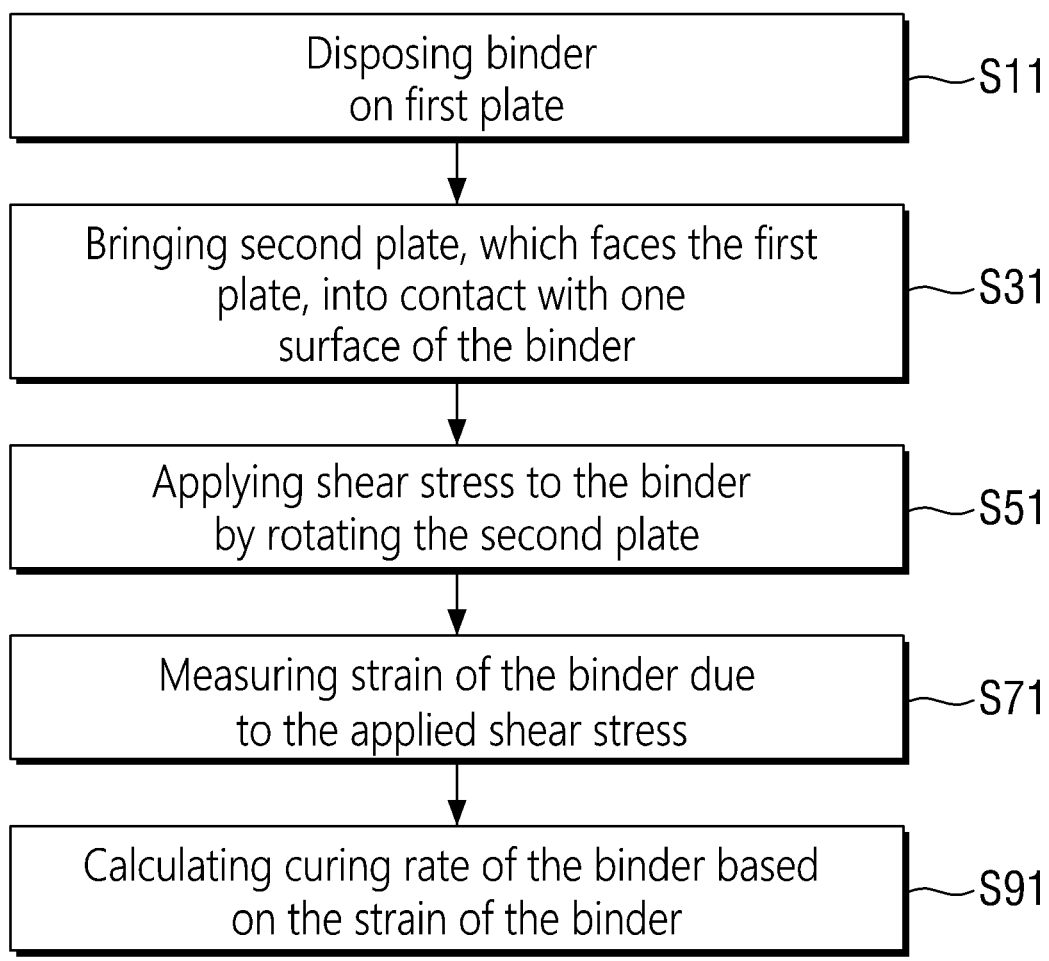
FIG. 12 is a flowchart of another exemplary embodiment of a method for evaluating a binder.
Figure 13:
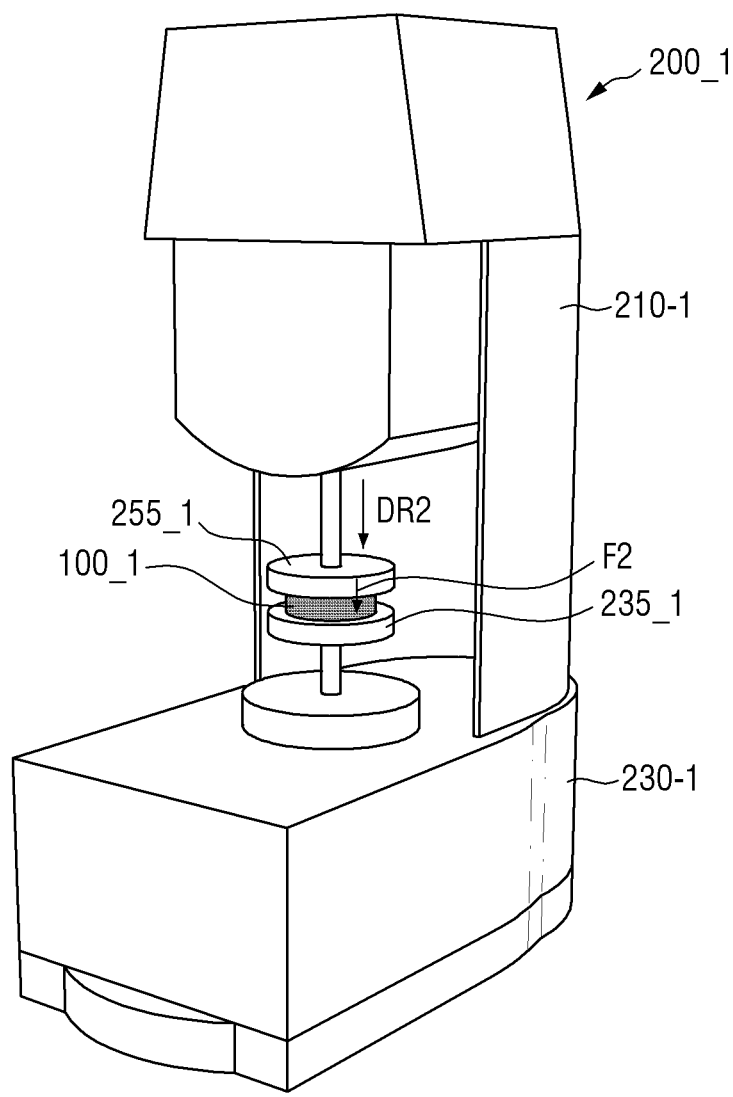
FIG. 13 is a perspective view showing another exemplary embodiment of a measurement apparatus which measures a binder.

FIG. 12 is a flowchart of a method for evaluating a binder according to still another exemplary embodiment. FIG. 13 is a perspective view showing a measurement apparatus which measures a binder according to still another exemplary embodiment.

Referring to FIGS. 12 and 13, an evaluation method 3 of a binder 100_1 according to the illustrated exemplary embodiment is different from the above-described exemplary embodiment in that the measurement apparatus 200 of the binder 100 is different and a curing rate CR_1 of the binder 100_1 is calculated by applying a compressive stress to the binder 100 to measure a compressive strain Cms_1 after deformation. The operations S11 and S31 substantially similar to those of the exemplary embodiment are not described, and operations S51, S71, and S91 which are different from the exemplary embodiment are mainly described.

Referring to FIG. 13, a measurement apparatus 200_1 includes a body 210_1, a support 230_1, a first plate 235_1 and a second plate 255_1. The body 210_1 and the support 230_1 of the measurement apparatus 200_1 perform substantially the same functions as those of the measurement apparatus 200 of FIG. 2, and a detailed description thereof will be omitted.

After the second plate 255_1 is brought into contact with one surface of the binder 100_1, the second plate 255_1 is compressed to apply a compressive stress to the binder 100_1 (S51).

The first plate 235_1 may be connected to the support 230_1 of the measurement apparatus 200_1 and the second plate 255_1 may be connected to the body 210_1 of the measurement apparatus 200_1. The second plate 255_1 may face the first plate 235_1.

The binder 100_1 may be disposed on one surface of the first plate 235_1. The second plate 255_1, which faces the first plate 235_1, may move to be into contact with one surface of the binder 100_1. That is, the second plate 255_1 may measure the physical properties of the binder 100_1 while moving in the vertical direction from the bottom of the body 210_1. As shown in FIG. 12, the second plate 255_1 may move in a second direction DR2 to provide a compressive stress F2 to the binder 100_1.

The first plate 235_1 may be disposed on the support 230_1 and physically fixed to the support 230_1. However, the invention is not limited thereto, and the first plate 235_1 may move in the vertical direction in the same manner as the second plate 255_1. Specifically, the first plate 235_1 may move in a direction opposite to the second direction DR2 to provide the compressive stress F2 to the binder 100_1.

The illustrated exemplary embodiment of the measurement apparatus 200_1 is an apparatus for applying the compressive stress F2 to the binder 100_1 and measuring the strain Cms_1 of the binder 100_1 to which the compressive stress F2 is applied, as described above. In an exemplary embodiment, the measurement apparatus 200_1 may be a rheometer, for example.

The shapes and materials of the first plate 235_1 and the second plate 255_1 may be the same or similar to those of the exemplary embodiment of the first plate 235 and the second plate 255. In an exemplary embodiment, the size of a planar jig of the first plate 235_1 may be the same as the size of a planar jig of the second plate 255_1, for example, but the invention is not limited thereto.

In an exemplary embodiment, the binder 100_1 may have a thickness of about 800 μm to about 1000 μm, for example.

The operation S51 of applying the compressive stress F2 to the binder 100_1 by moving the second plate 255_1 may be performed at a measurement temperature of about −10° C. to about 90° C., for example.

Further, the operation S51 of applying the compressive stress F2 to the binder 100_1 by moving the second plate 255_1 may include applying the compressive stress F2 of about 1000 Pa to about 5000 Pa, for example. The operation S50 of applying the compressive stress F2 to the binder 100_1 may continuously apply the compressive stress F2 having a constant value within the above-mentioned range of the compressive stress F2.

Thereafter, the curing rate CR_1 of the binder 100_1 is calculated based on the strain Cms_1 of the binder 100_1 (S91). The operation S91 of calculating the curing rate CR_1 of the binder 100_1 based on the strain Cms_1 of the binder 100_1 is substantially similar to the operation S90 of calculating the curing rate of the binder based on the exemplary embodiment of the strain of the binder, but differs from that of the exemplary embodiment in that the strain of the binder is a compressive strain.

The operation of calculating the curing rate CR_1 of the binder 100_1 may include measuring all of a strain Cuc_1 of the uncured binder and a strain Cfc_1 of the fully cured binder which have been previously stored and the strain Cmc_1 of the binder 100_1 in the same environment. The environment may be a temperature and/or intensity of applied compressive stress.

The operation of calculating the curing rate CR_1 of the binder 100_1 may include calculating the curing rate CR_1 of the binder 100_1 by the following conversion equation. The conversion equation is as follows:

$$CR\_1(Curing\ Rate(\%)) = \frac{\{(Cuc\_1 - Cfc\_1) - (Cms\_1 - Cfc\_1)\} \times 100}{(Cuc\_1 - Cfc\_1)},$$

where Cuc_1 is the compressive strain of the uncured binder, Cfc_1 is the compressive strain of the fully cured binder, and Cms_1 is the compressive strain of the binder 100.

Similarly to the above-described embodiment, the curing rate CR_1 and the strain Cms_1 of the binder 100_1 have correlation with each other. That is, the strain Cms_1 of the binder 100_1 may be substantially proportional to the curing rate CR_1. In other words, the strain Cms_1 of the binder 100_1 may increase as the curing rate CR_1 increases, and the strain Cms_1 of the binder 100_1 may decrease as the curing rate CR_1 decreases.

The illustrated exemplary embodiment of the evaluation method 3 of the binder 100_1 includes converting the strain Cms_1 of the binder 100_1 into the curing rate CR_1 of the binder 100_1 by the conversion equation described above, so that the curing rate CR_1 of the binder 100_1 may be accurately measured before being applied to the display device.

The illustrated exemplary embodiment of the evaluation method 3 of the binder 100_1 may further include, after performing the operation S91 of calculating the curing rate CR_1 of the binder 100_1, determining whether the binder 100_1 is defective by comparing the curing rate CR_1 of the binder 100_1 with a standard curing rate which has been previously stored.

The operation of determining whether the binder 100_1 is defective may further include determining that the binder 100_1 is non-defective when the curing rate CR_1 of the binder 100_1 is within a reference range of the standard curing rate and determining that the binder 100_1 is defective when it does not fall within the reference range of the standard curing rate.

In the illustrated exemplary embodiment of the evaluation method 3 of the binder 100_1, while the curing rate of each binder is accurately calculated, whether the binder is defective is determined. Thus, it is possible to prevent a bonding defect and/or a display failure which may occur when a defective binder is applied to a display device.

Figure 14:
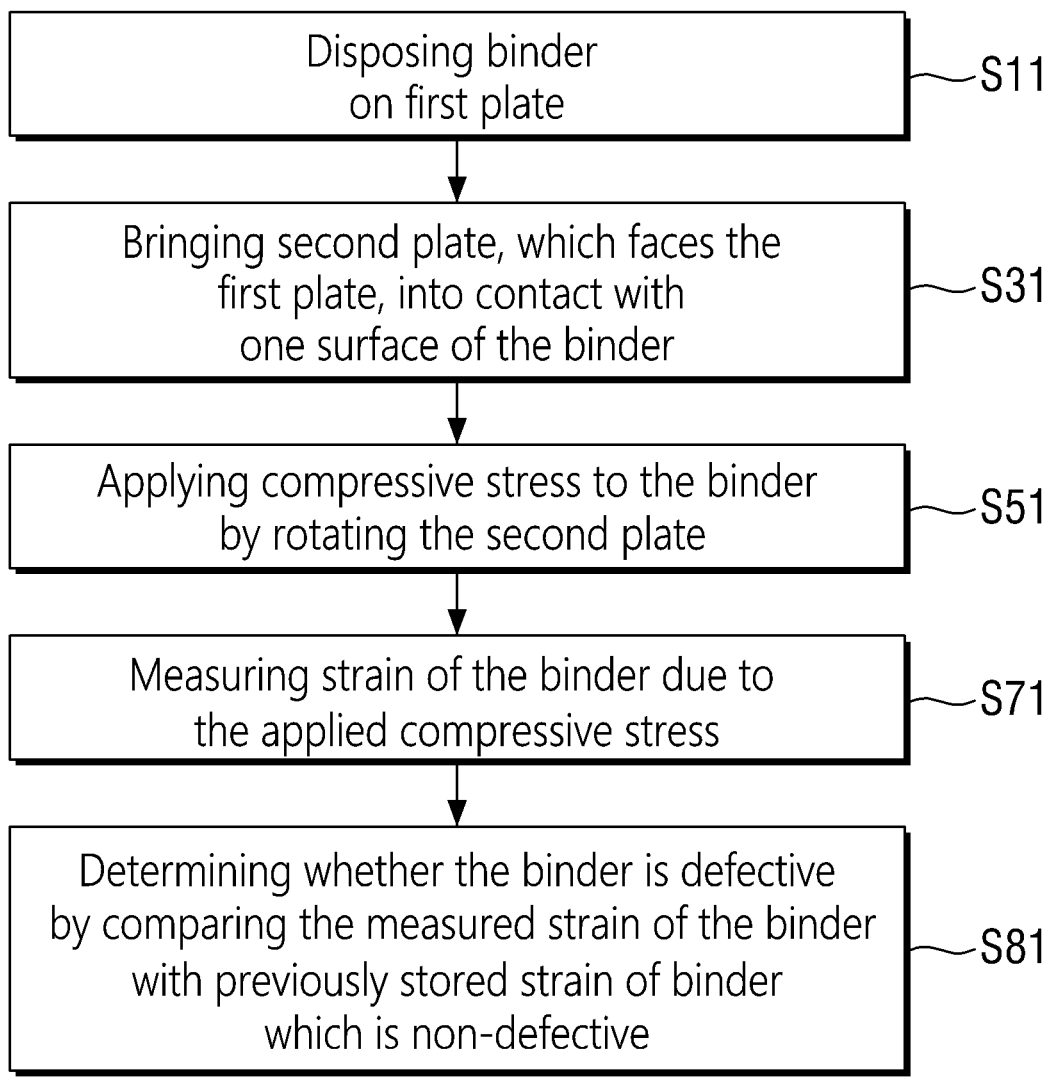
FIG. 14 is a flowchart of another exemplary embodiment of a method for evaluating a binder.
Figure 15:
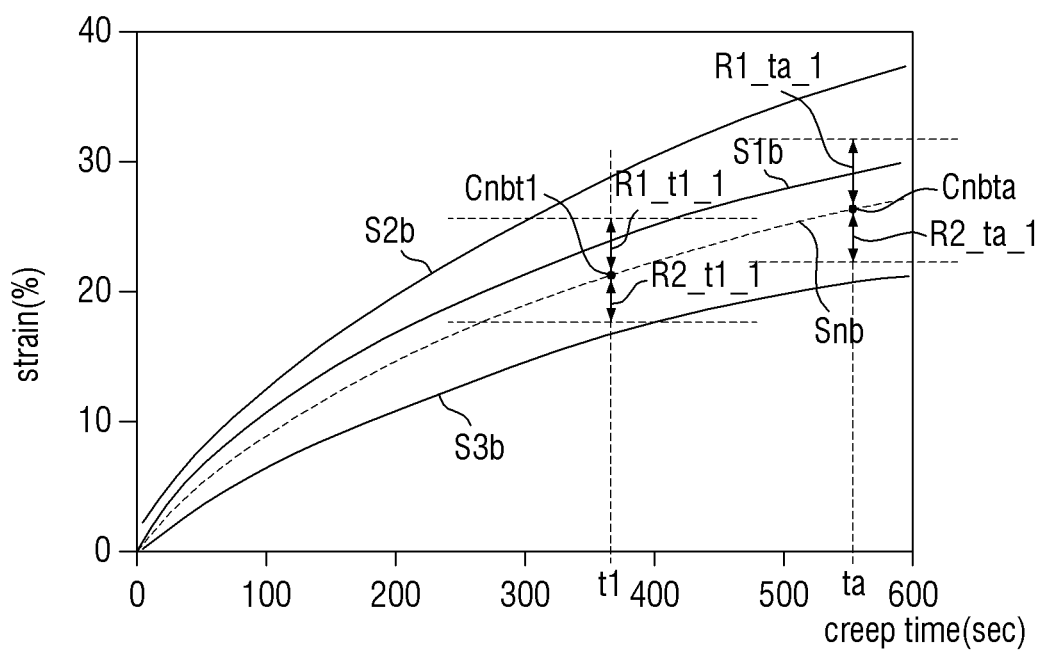
FIG. 15 is a graph showing a strain according to measurement time of each sample.

FIG. 14 is a flowchart of a method for evaluating a binder according to still another exemplary embodiment, and FIG. 15 is a graph showing a strain according to measurement time of each sample.

Referring to FIGS. 14 and 15, the illustrated exemplary embodiment of an evaluation method 4 of the binder 100_1 is different from the exemplary embodiment of the evaluation method 3 of the binder 100_1 shown in FIG. 12 in that the evaluation method 4 includes, after the operation of measuring the strain Cms_1 of the binder 100_1, determining whether the binder 100_1 is defective by comparing the measured strain Cms_1 of the binder 100_1 with a previously stored strain Cn of a binder Cnb which is non-defective (S81).

The illustrated exemplary embodiment of the evaluation method 4 of the binder 100_1 may evaluate a plurality of binders 100_1. In an exemplary embodiment, the plurality of binders 100_1 may include a first sample S1b, a second sample S2b and a third sample S3b, for example. The samples S1b, S2b and S3b may have different strains at the same measurement time under the same compressive stress F2 (refer to FIG. 13). This will be described in more detail with reference to FIG. 15.

FIG. 15 is a graph comparing strains of different binder samples S1b, S2b and S3b measured at a first time t1 with a strain Cnbt1 of the non-defective binder Snb. A horizontal axis represents the measurement time and a vertical axis represents the strain of each of the samples S1b, S2b and S3b. Since FIG. 15 shows the strain of each of the samples S1b, S2b and S3b and the strain Cnbt1 of the non-defective binder Snb, but shows an example illustrating the correlation therebetween, the invention is not limited to the specific numerical values set forth above.

Referring to FIG. 15, the strain of each of the samples S1b, S2b and S3b may increase as the measurement time increases. That is, when a certain compressive stress F2 is applied to the binder samples S1b, S2b and S3b in the same direction, the strain of each of the binder samples S1b, S2b and S3b tends to diverge in a positive direction.

Further, as the measurement time increases, a difference between the strain of the non-defective binder Snb and the strain of each of the binder samples Sib, S2b and S3b tends to be larger. Thus, it is possible to easily sort non-defective and defective samples.

Specifically, the operation S81 of evaluating whether the binder 100_1 is defective by comparing the strain Cms_1 of the binder 100_1 with the previously stored strain of the non-defective binder Snb may include determining that it is non-defective when the strain of each of the samples S1b, S2b and S3b is within a predetermined reference range of the strain of the non-defective binder Snb, and determining that it is defective when the strain is outside the reference range.

The operation S81 of evaluating whether the binder 100_1 is defective by comparing the strain Cms_1 of the binder 100_1 with the previously stored strain of the non-defective binder Snb may include determining that the measured sample is non-defective when the strain Cnbt1 of the non-defective binder Snb at a first measurement time t1 is within a range between a value increased by a first reference range R1_t1_1 and a value decreased by a second reference range R2_t1_1, and determining that the measured sample is defective when the strain Cnbt1 of the non-defective binder Snb at the first measurement time t1 is outside the range between the value increased by the first reference range R1_t1_1 and the value decreased by the second reference range R2_t1_1. The first reference range R1_t1_1 and the second reference range R2_t1_1 may have the same value.

In some exemplary embodiments, the operation S81 of evaluating whether the binder 100_1 is defective by comparing the strain Cms_1 of the binder 100_1 with the previously stored strain of the non-defective binder Snb may be performed at a standard measurement time ta. In an exemplary embodiment, the standard measurement time ta may be about 500 s to about 700 s, for example.

That is, when a strain Cnbta of the non-defective binder Snb in a range of the standard measurement time ta is within a range between a value increased by a first reference range R1_ta_1 and a value decreased by a second reference range R2_ta_1, it may be determined that the measured sample is non-defective. However, when the strain Cnbta of the non-defective binder Snb in the range of the standard measurement time ta is outside the range between the value increased by the first reference range R1_ta_1 and the value decreased by the second reference range R2_ta_1, it may be determined that the measured sample is defective. Specifically, each of the first reference range R1_ta_1 and the second reference range R2_ta_1 may have a value of about 15%. All the samples having a strain in the range of +15% to −15% of the strain Cnbta of the non-defective binder Snb at the standard measurement time ta may be determined to be non-defective, and all the samples having a strain in the other range (greater than +15%, less than −15%) may be determined to be defective.

Figure 16:
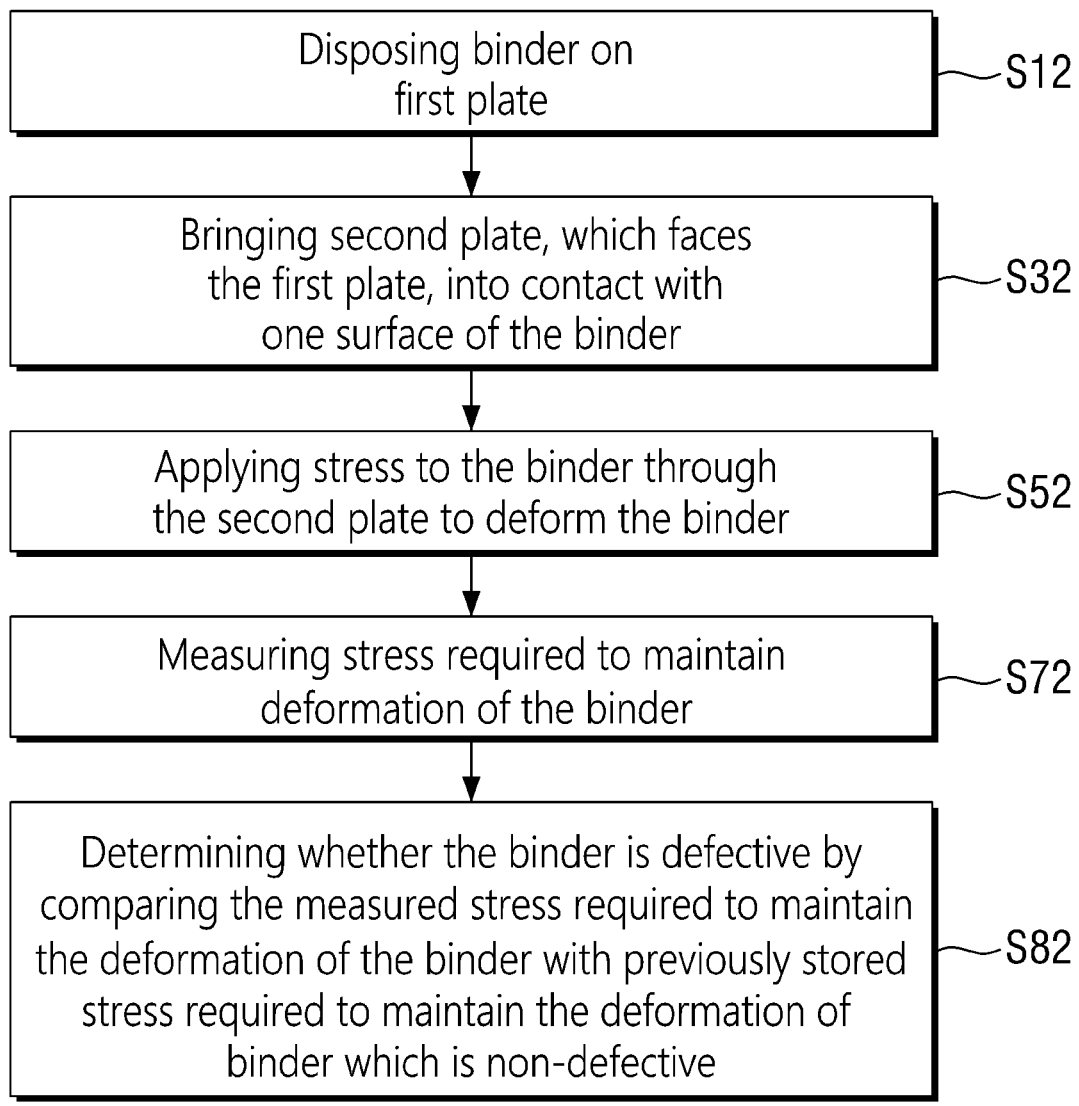
FIG. 16 is a flowchart of another exemplary embodiment of a method for evaluating a binder.
Figure 17:
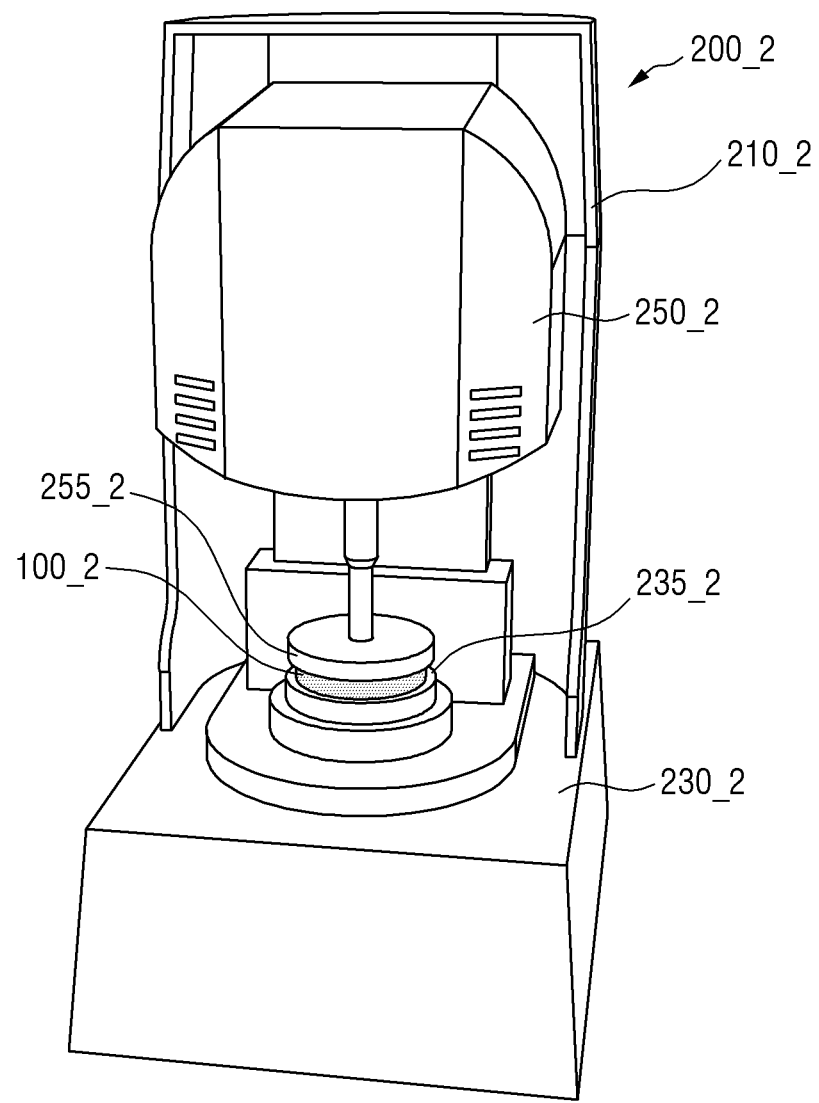
FIG. 17 is a perspective view showing another exemplary embodiment of a measurement apparatus which measures a binder.
Figure 18:
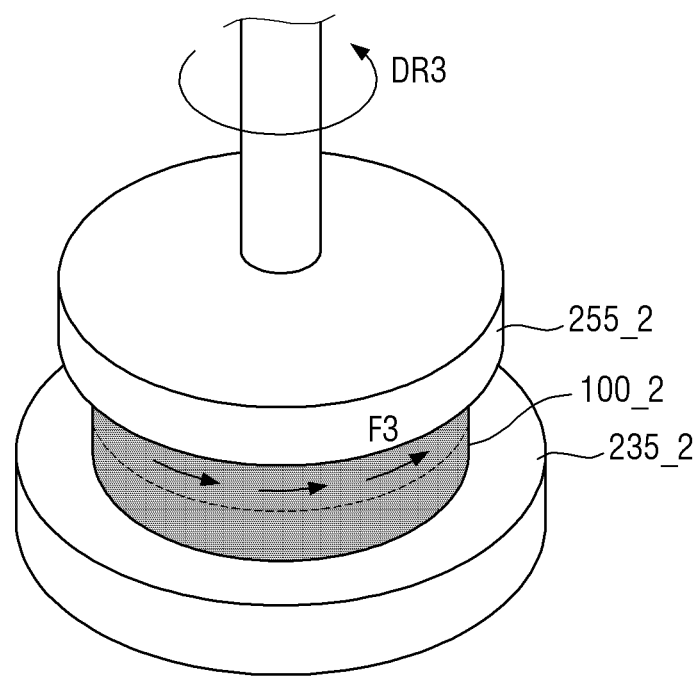
FIGS. 18 and 19 are perspective views showing another exemplary embodiment of an operation of measuring a binder by a measurement apparatus.
Figure 19:
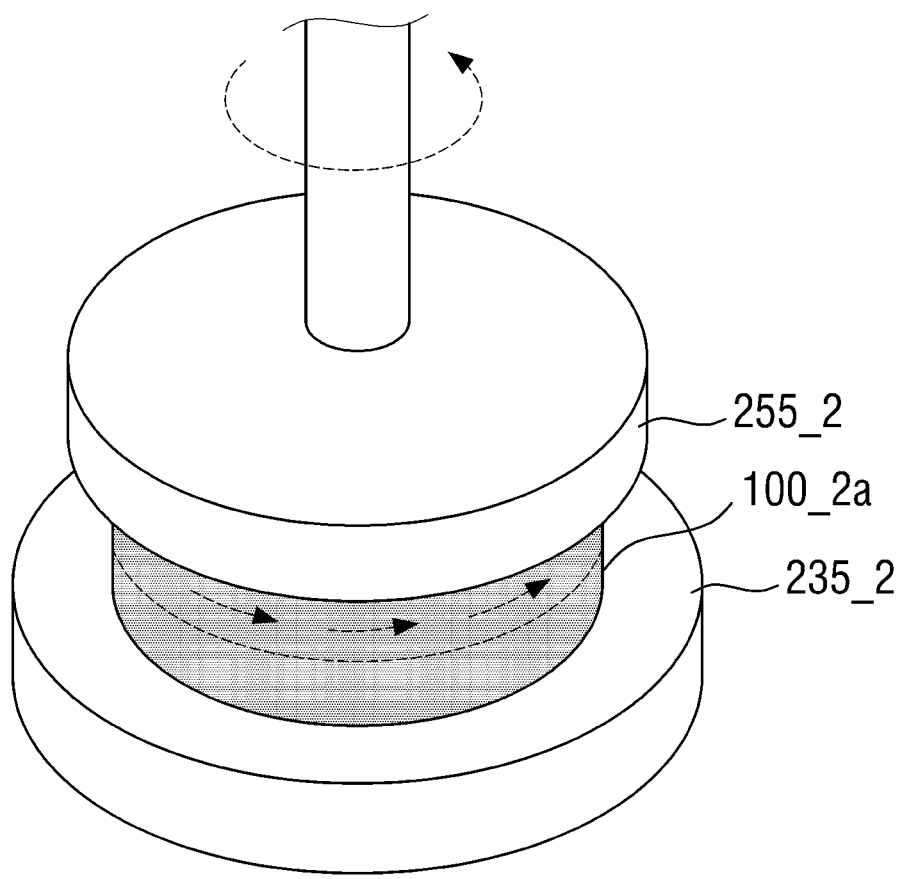
Figure 20:
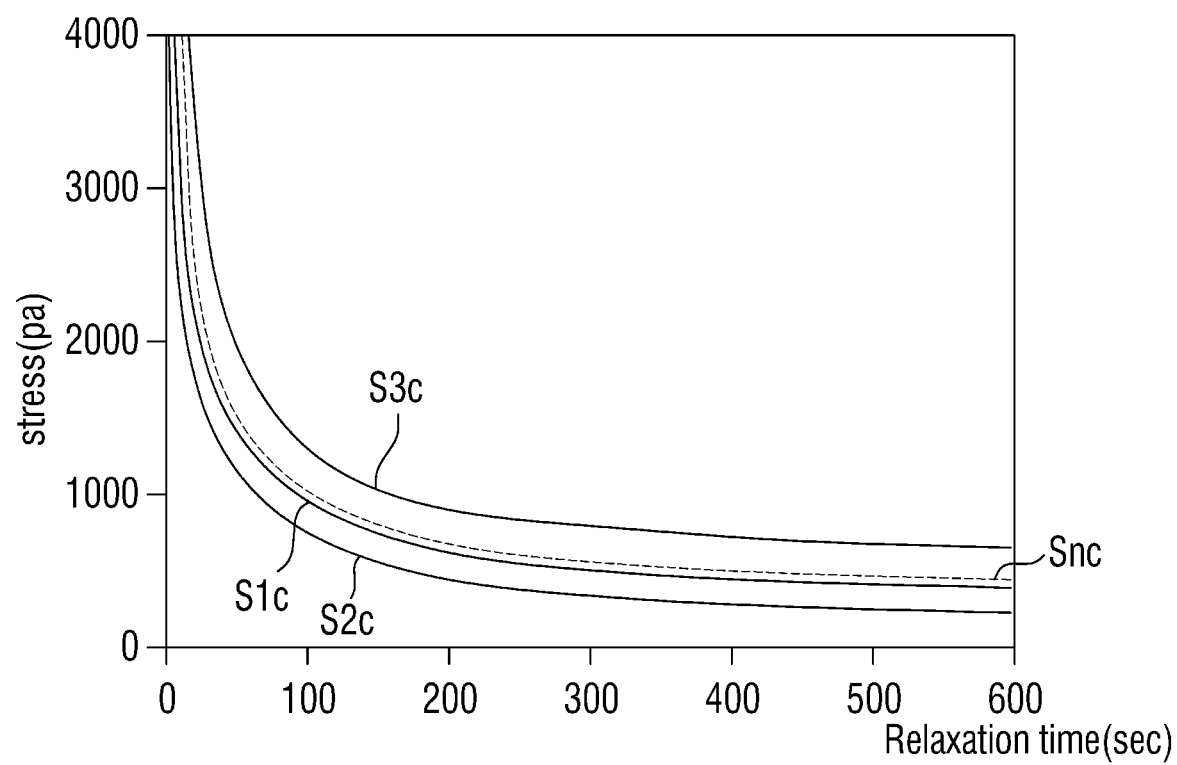
FIG. 20 is a graph showing a change in stress over measurement time after applying a constant deformation to each sample.

FIG. 16 is a flowchart of another exemplary embodiment of a method for evaluating a binder. FIG. 17 is a perspective view showing another exemplary embodiment of a measurement apparatus which measures a binder. FIGS. 18 and 19 are perspective views showing another exemplary embodiment of an operation of measuring a binder by a measurement apparatus. FIG. 20 is a graph showing a change in stress over measurement time after applying a constant deformation to each sample.

Referring to FIGS. 16 to 20, the illustrated exemplary embodiment is different from the exemplary embodiment of FIG. 7 in that it includes applying a stress to a binder through a second plate to deform the binder, measuring the stress desired to maintain the deformation of the binder, and determining whether the binder is defective by comparing the measured stress desired to maintain the deformation of the binder with a previously stored stress desired to maintain the deformation of a binder which is non-defective. Hereinafter, the differences are mainly described.

The operations S12 and S32 substantially similar to those of the exemplary embodiment of FIG. 7 are not described.

After the operation S32 of bringing a second plate 255_2 into contact with one surface of a binder 100_2, a stress is applied to the binder 100_2 through the second plate 255_2 to deform the binder 100_2 (S52). As shown in FIG. 17, the operation of applying a stress to the binder 100_2 through the second plate 255_2 to deform the binder 100_2 may include applying a shear stress F3 to the binder 100_2 by rotating the second plate 255_2 in a third direction DR3. The third direction DR3 may be the same as the exemplary embodiment of the first direction DR1, or may be a direction opposite to the first direction DR1.

In alternative exemplary embodiments, the operation of applying a stress to the binder 100_2 through the second plate 255_2 to deform the binder 100_2 may include applying a compressive stress to the binder 100_2 by moving the second plate 255_2 in a vertical direction. The vertical direction may be substantially the same as the second direction DR2 of FIG. 13.

Referring to FIGS. 17 and 18, the illustrated exemplary embodiment of the measurement apparatus 200_2 applies a stress to the binder 100_2 by the second plate 255_2. After the second plate 255_2 applies a stress to the binder 100_2, the measurement apparatus 200_2 may fix a binder 100_2a while being deformed by the stress, as shown in FIG. 19.

A body 210_2, a support 230_2, a power unit 250_2, a first plate 235_2 and the second plate 255_2 of the measurement apparatus 200_2 may be substantially the same or similar to those of the measurement apparatus 200 according to the above-described embodiment. Hereinafter, differences of the measurement apparatus 200_2 from the measurement apparatus 200 according to the above-described exemplary embodiment will be mainly described.

The measurement apparatus 200_2 may be an apparatus for measuring stress relaxation of the binder 100_2.

Then, the stress desired to maintain deformation of the binder 100_2 is measured (S72). This will be described with reference to FIG. 20. FIG. 20 is a graph comparing strains of different binder samples S1c, S2c and S3c measured at a first time t1 with a strain of a non-defective binder Snc. A horizontal axis represents the measurement time and a vertical axis represents the stress value for maintaining a constant strain of each of the binder samples S1c, S2c and S3c. FIG. 20 shows the stress values of the samples S1c, S2c and S3c and the non-defective binder, but it is merely an example. Thus, the invention is not limited to the specific numerical values set forth above.

Referring to FIG. 20, the stress value of each of the samples S1c, S2c and S3c may decrease as the measurement time increases. That is, after applying a constant stress to the binder samples S1c, S2c and S3c to apply deformation, the stress value of each of the binder samples S1c, S2c and S3c to maintain the strain tends to converge as the measurement time increases.

Referring again to FIG. 17, it is determined whether the binder is defective by comparing the measured stress desired to maintain the deformation of the binder 100_2 with the previously stored stress desired to maintain the deformation of the non-defective binder Snc (S82).

The operation of determining whether the binder is defective by comparing the stress desired to maintain the deformation of the binder 100_2 with the previously stored stress desired to maintain the deformation of the non-defective binder Snc may include determining that it is non-defective when the stress of each of the samples S1c, S2c and S3c is within a predetermined reference range of the stress of the non-defective binder Snc, and determining that it is defective when the stress is outside the reference range.

In concluding the detailed description, those skilled in the art will appreciate that many variations and modifications may be made to the preferred embodiments without substantially departing from the principles of the invention. Therefore, the disclosed preferred embodiments of the invention are used in a generic and descriptive sense only and not for purposes of limitation.

What is claimed is:

1. A method for evaluating a binder, the method comprising:
    disposing the binder on a first plate;
    bringing a second plate, which faces the first plate, into contact with one surface of the binder;
    applying a stress to the binder through the second plate;
    measuring a strain of the binder due to the applied stress; and
    calculating a curing rate of the binder based on the strain of the binder,
    wherein the applying the stress to the binder comprises applying at least one of a shear stress to the binder by rotating the second plate and a compressive stress to the binder by moving the second plate.

2. The method of claim 1, wherein the binder includes at least one of an adhesive and a tackifier.

3. The method of claim 2, wherein the adhesive includes at least one of optically clear resin and liquid optically clear adhesive, and
    the tackifier includes an optically clear adhesive.

4. The method of claim 1, wherein the applying the stress to the binder comprises applying the shear stress to the binder by rotating the second plate.

5. The method of claim 1, wherein the applying the stress to the binder comprises applying the compressive stress to the binder by moving the second plate.

6. The method of claim 1, wherein the applying the stress to the binder through the second plate is performed using a measurement apparatus, and
the measurement apparatus is a rheometer including the first plate and the second plate.

7. The method of claim 1, wherein the measuring the strain of the binder is performed for a period of about 60 seconds to about 3600 seconds.

8. The method of claim 1, wherein the measuring the strain of the binder is performed in a temperature range of about 0 degree Celsius to about 90 degrees Celsius.

9. The method of claim 1, wherein the calculating the curing rate of the binder comprises calculating further based on a strain of an uncured binder and a strain of a fully cured binder, which are previously stored.

10. The method of claim 9, wherein the calculating the curing rate of the binder comprises calculating using a following conversion equation:

$$CR(\text{Curing Rate}(\%)) = \frac{\{(Cuc - Cfc) - (Cms - Cfc)\} \times 100}{(Cuc - Cfc)},$$

where Cuc is the strain of the uncured binder, Cfc is the strain of the fully cured binder, and Cms is the strain of the binder.

11. The method of claim 10, wherein the strain of the uncured binder, the strain of the fully cured binder and the strain of the binder are measured at a same temperature.

12. The method of claim 11, wherein the strain of the uncured binder, the strain of the fully cured binder and the strain of the binder are measured at a same shear stress.

13. The method of claim 9, further comprising, after calculating the curing rate of the binder, determining whether the binder is defective by comparing the curing rate of the binder with a standard curing rate which is previously stored.

14. A method for evaluating a binder, the method comprising:
disposing the binder on a first plate;
bringing a second plate, which faces the first plate, into contact with one surface of the binder;
applying a stress to the binder through the second plate;
measuring a strain of the binder due to the applied stress; and
determining whether the binder is defective by comparing the measured strain of the binder with a previously stored strain of a non-defective binder.

15. The method of claim 14, wherein the binder includes at least one of an adhesive and a tackifier, and
wherein the adhesive includes at least one of optically clear resin and liquid optically clear adhesive, and the tackifier includes an optically clear adhesive.

16. The method of claim 14, wherein the applying the stress to the binder comprises applying a shear stress to the binder by rotating the second plate.

17. The method of claim 14, wherein the applying the stress to the binder comprises applying a compressive stress to the binder by moving the second plate.

18. The method of claim 14, wherein when applying the stress to the binder, a measurement apparatus increases the applied stress according to measurement time.

19. The method of claim 18, wherein the applied stress is increased from 1000 pascals to 5000 pascals according to the measurement time.

20. The method of claim 14, wherein the determining whether the binder is defective by comparing the strain of the binder with a previously stored strain of the non-defective binder comprises determining that the binder is non-defective when the strain of the binder is within a reference range of the strain of the non-defective binder.

* * * * *